Oct. 14, 1947.   C. W. KELSEY   2,428,973
AUTOMATIC FLYWHEEL RELEASE CLUTCH TO FACILITATE MOTOR STALLING
Filed Oct. 31, 1944

INVENTOR.
Cadwallader W. Kelsey
BY
ATTORNEY

Patented Oct. 14, 1947

2,428,973

UNITED STATES PATENT OFFICE 2,428,973

AUTOMATIC FLYWHEEL RELEASE CLUTCH TO FACILITATE MOTOR STALLING

Cadwallader W. Kelsey, Troy, N. Y., assignor to Rototiller, Inc., Troy, N. Y., a corporation of Delaware Application October 31, 1944, Serial No. 561,220

5 Claims. (Cl. 97—40)

My invention relates to soil tillers of the rotary type and particularly to a new device for effecting a quick and easy stalling of the motor when the tilling tools encounter obstructions of such character that rotation thereof is prevented. Tilling devices of this character are propelled along the ground and the tilling tools are rotated by an internal combustion engine having a fly wheel of rather substantial weight on the shaft thereof. Fly wheels which are rigidly attached to the motor shaft and turning at substantial speed, possess considerable inertia which tends to maintain the motor shaft and all the parts connected thereto in motion. Hence, when the tilling tools encounter a bad obstruction which appreciably retards their speed, or stops them, severe stresses are set up throughout the entire mechanism due in considerable part to the energy stored in the rotating fly wheel.

It has heretofore been suggested to mount the fly wheel on the conical end of the engine shaft but without keying it thereto, and to maintain it merely in frictional engagement with the shaft by means of a spring. However, the shafts are of comparatively small diameter and the frictional contact area between the fly wheel and shaft is so small that it is practically impossible to maintain the parts in properly adjusted relation due to rapid wear. Moreover, the flywheel and the shaft are made of similar metals which do not function well in running contact with each other.

The principal object of my invention is to provide a fly wheel of such type that, while under normal operating conditions it will function in exactly the same way as the fly wheel which is rigidly attached to the engine shaft, nevertheless, when an obstruction is encountered by the tilling tools which offers great resistance to their turning, the kinetic energy stored in the fly wheel and which, in the case of fly wheels rigidly attached to the engine shaft tends to keep the engine and all of the other moving parts driven thereby in motion, will be dissipated in friction rather than in overload strains set up in the engine, its shaft, and the other mechanism, and the engine will stall quickly. Another object is to provide an improved device of this character in which the fly wheel is frictionally connected to the engine shaft instead of being rigidly connected thereto, and in which the friction developed by relative rotative movements of the fly wheel and the engine shaft is distributed over a comparatively large surface area, whereby wear on said area is minimized. A further object is to provide an improved device of the character described in which bearing surfaces are provided for the fly wheel which are independent of the surfaces between which the friction is developed and on which the fly wheel has a free running fit irrespective of the pressure between the friction areas.

I accomplish these objects by means of the novel elements and the combinations and arrangements thereof described below and illustrated in the accompanying drawing in which—

Referring to the drawings—

Figure 1:
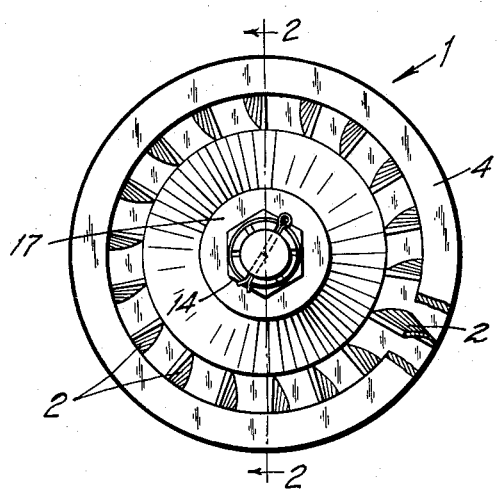
Fig. 1 is a front elevation view of my fly wheel.
Figure 2:
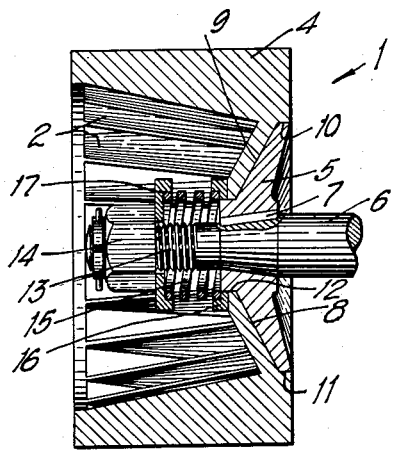
Fig. 2 is a section of Fig. 1 in the plane 2—2.
Figure 3:
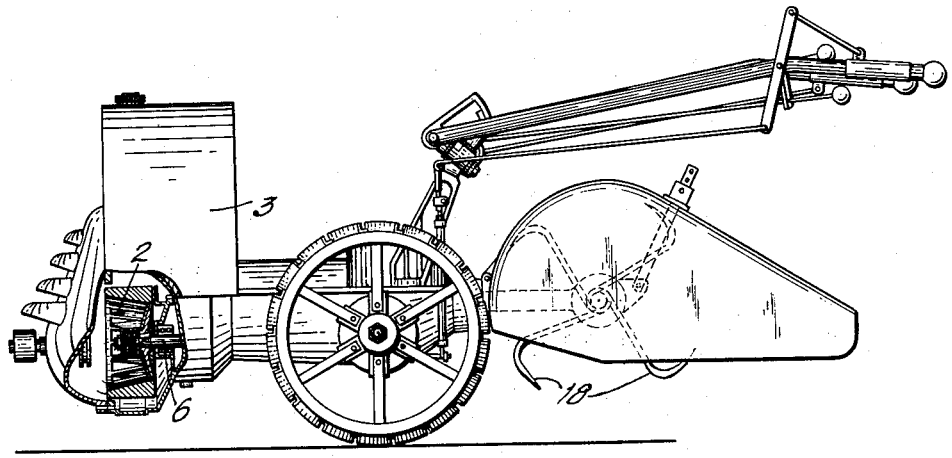
Fig. 3 is a fragmentary side elevation of a rotary tiller with certain portions broken away to show the application of the fly wheel to the motor shaft.

I generally represents the fly wheel, here shown as embodying blades 2 which constitute a fan for cooling the motor by means of a blast of air. The motor is not shown but is understood to be within the hood 3. The fly wheel in its general configuration does not differ a great deal from the fly wheels which are ordinarily employed and is so designed that it may be substituted therefor. However, instead of being formed from a single casting which is keyed to the engine shaft, it comprises two elements 4 and 5; the element 4 being ordinarily cast iron and embodying the fan blades 2, and the element 5 being a bronze casting which is keyed to the engine shaft 6, as shown at 7. The surface 8 of the element 5 is conical, or frusto-conical, and is received in a complementary conical reentrant portion 9 in the element 4. The conical surface 8 on the element 5 is in frictional contact with the complementary conical surface in the element 4, and the friction between these surfaces constitutes the driving connection between the element 4 of the fly wheel and the shaft 6. The exterior 12 of the hub portion of element 5 is cylindrical and, together with the cylindrical portion 10, functions as a bearing for the element 4 which maintains it coaxial with shaft 6 as it rotates relative to the member 5.

In order to vary the friction between the surfaces 8 and 9 the end of the shaft 6 is threaded as shown at 13 to receive the nut 14 by means of which the compression on spring 15 may be varied. This spring is compressed between the washer 16 which rides against the inner central portion of the element 4 and the washer 17 which abuts the nut 14. The spring 15 forces the surfaces 8 and 9 together and by adjusting the nut 14 the pressure of the surface 9 against the surface 8 may be varied so that, under normal operating conditions, there will be no relative rotation between the elements 4 and 5 and hence no relative rotation of the element 4 and the engine shaft 6. However, when the fly wheel and the shaft 6 are rotating together at comparatively high speed and the rotation of the shaft 6 is suddenly retarded or stopped entirely the static frictional connection between the members 4 and 5 will be broken and the element 4 will continue to rotate until the energy stored therein is dissipated in friction developed between the contacting surfaces of the elements 4 and 5.

Thus, when the tiller is in operation and the tilling tools 18, which are driven by the motor through the drive shaft 6 and a driven shaft and gears (not shown) but the construction of which is well understood in the art, encounter an obstruction of such character that their rotation is appreciably retarded or stopped, the heavier element 4 of the fly wheel 1 will continue to rotate, the strains on the mechanism which would otherwise be developed in stopping the fly wheel and the motor shaft will be eliminated, and the motor will stall while the fly wheel may still be rotating.

Wear in the device is practically confined to the conical surfaces with little or no wear on the cylindrical bearing surfaces, and wear on the conical surfaces may be taken up by means of the nut 14 without affecting the fit of the cylindrical surfaces.

What I claim is:

1. In a rotary soil tilling device, the combination with a drive shaft, of rotary soil tilling tools driven thereby, a flywheel, a mounting for said flywheel on said shaft, resilient means biased to urge said flywheel into frictional engagement with said mounting at all times, and means for adjusting said resilient means to vary the friction between said flywheel and said mounting so that, under normal loads on said tools, said flywheel will be substantially positively driven by said shaft but, when the movement of said shaft is suddenly stopped by an overload on said tools, said flywheel will continue to rotate; whereby its kinetic energy will be dissipated as friction between said wheel and said mounting rather than by stresses set up in the other parts of said device.

2. In a rotary soil tilling device, the combination with a drive shaft, of rotary soil tilling tools driven thereby, a flywheel, means rigidly connected to said shaft and forming a bearing upon which said wheel may rotate relative to said shaft, resilient means holding said wheel to said bearing-forming means in frictional engagement therewith at all times, and means for adjusting said resilient means so that, under normal loads on said tools, said wheel will be substantially positively driven by said shaft but, when said shaft is suddenly stopped by an overload on said tools, said flywheel will continue to rotate and its kinetic energy will be dissipated as friction between said wheel and said bearing-forming means rather than by stresses set up in the other parts of said device.

3. In a rotary soil tilling device, the combination with rotary soil tilling tools, of a main drive shaft therefor, a first clutch member fixed to said shaft, a flywheel including a second clutch member cooperating with said first member, a spring compressing said clutch members together and holding said members in frictional engagement at all times, and means for adjusting said spring so that, under normal loads on said tools, said wheel will be substantially positively driven by said shaft but, when the movement of said shaft is suddenly stopped by an overload on said tools, said clutch will slip and said flywheel will rotate independently of said shaft and its kinetic energy will be dissipated as friction in said clutch members rather than as stresses set up in the other parts of said device.

4. In a rotary soil tilling device, the combination with a driving shaft, of rotary soil tilling tools driven thereby, a cylindrical bearing having a frusto-conical portion forming a first clutch element coaxial with and fixed to said shaft, a flywheel rotatably mounted on said cylindrical bearing and having a complementary frusto-conical portion forming a second clutch element interfitting with said first clutch element, a spring yieldingly holding said clutch elements in coaxial, frictional engagement with each other at all times, and means for adjusting said spring to vary the force with which it holds said clutch elements in frictional engagement with each other to provide a substantially positive driving connection between said flywheel and said shaft when said tools are operating under normal load conditions, but which said connection will slip in the event of an abrupt stoppage of said tools due to an overload thereon; whereby said flywheel's kinetic energy will be dissipated as friction in said clutch elements rather than as stresses set up in the other parts of said device.

5. In a rotary soil tilling device, the combination with rotary soil tilling tools, of a main drive shaft therefor, a first clutch member fixed to said shaft and including a bearing, a flywheel including a second clutch member frictionally cooperating with said first clutch member and rotatably mounted on said bearing, resilient means compressing said clutch members together and holding said members in frictional contact at all times, and means for adjusting said resilient means so that, under normal loads on said tools, said wheel will be substantially positively driven by said shaft but, when the movement of said shaft is suddenly stopped by an overload on said tools, said clutch will slip and said flywheel will rotate independently of said shaft and said flywheel's kinetic energy will be dissipated as friction in said clutch members rather than stresses set up in the other parts of said device.

CADWALLADER W. KELSEY.

REFERENCES CITED

The following references are of record in the file of this patent:

UNITED STATES PATENTS

| Number | Name | Date |
| --- | --- | --- |
| 405,845 | Le Clair | June 25, 1889 |
| 1,171,010 | Meyenburg | Feb. 8, 1916 |
| 1,189,207 | Funk | June 27, 1916 |
| 1,218,719 | Tibbetts | Mar. 13, 1917 |
| 1,412,308 | Korsmeyer | Apr. 11, 1922 |
| 1,419,722 | Dittmar | June 13, 1922 |
| 1,848,260 | McCray | Mar. 8, 1932 |
| 1,996,510 | Glasier | Apr. 2, 1935 |
| 2,229,497 | Dontje | Jan. 21, 1941 |